(12) United States Patent
Kimura

(10) Patent No.: US 11,199,400 B2
(45) Date of Patent: Dec. 14, 2021

(54) OPTICAL ANGLE SENSOR

(71) Applicant: MITUTOYO CORPORATION, Kanagawa (JP)

(72) Inventor: Akihide Kimura, Saitama (JP)

(73) Assignee: MITUTOYO CORPORATION, Kanagawa (JP)

( * ) Notice: Subject to any disclaimer, the term of this patent is extended or adjusted under 35 U.S.C. 154(b) by 74 days.

(21) Appl. No.: 16/881,578

(22) Filed: May 22, 2020

(65) Prior Publication Data
US 2020/0378757 A1 Dec. 3, 2020

(30) Foreign Application Priority Data
Jun. 3, 2019 (JP) .............................. JP2019-103771

(51) Int. Cl.
  *G02B 5/18* (2006.01)
  *G01B 11/26* (2006.01)

(52) U.S. Cl.
  CPC ............ *G01B 11/26* (2013.01); *G02B 5/1866* (2013.01)

(58) Field of Classification Search
  CPC ........ G01B 11/26; G01B 9/02; G02B 5/1866; G01D 5/38; G01D 5/266; G01D 5/34746; G01D 5/34715
  USPC ........................................................ 356/482
  See application file for complete search history.

(56) References Cited

U.S. PATENT DOCUMENTS

| | | | | |
|---|---|---|---|---|
| 5,969,817 A | * | 10/1999 | Ohsawa | G01B 11/26 356/510 |
| 2006/0139654 A1 | * | 6/2006 | Takahashi | G01D 5/34715 356/494 |
| 2012/0194824 A1 | * | 8/2012 | de Groot et al. | G03F 7/70775 356/482 |
| 2014/0300903 A1 | * | 10/2014 | Shimizu | G01D 5/30 356/498 |
| 2015/0036144 A1 | * | 2/2015 | Shimizu | G01D 5/3473 356/450 |
| 2016/0102999 A1 | * | 4/2016 | Liesener | G01D 5/266 356/488 |
| 2016/0146722 A1 | * | 5/2016 | Koerner | G01B 9/02091 356/301 |
| 2017/0030744 A1 | * | 2/2017 | Kimura | G01D 5/38 |
| 2017/0350689 A1 | * | 12/2017 | Matsushita | G01B 9/02061 |

FOREIGN PATENT DOCUMENTS

| JP | 11-237207 | 8/1999 |
|---|---|---|
| JP | 2003-156319 | 5/2003 |

* cited by examiner

*Primary Examiner* — Isiaka O Akanbi
(74) *Attorney, Agent, or Firm* — Greenblum & Bernstein, P.L.C.

(57) ABSTRACT

The optical angle sensor comprises a diffraction unit, a light source, a light receiving unit, and a plurality of reflection units. The diffraction unit includes a first diffraction part for generating combined light and a second diffraction part for diffracting a first light and a second light a plurality of times. The plurality of reflection units includes a first reflection unit, a second reflection unit, a third reflection unit that reflects the first light and the second light through the second diffraction part toward the second diffraction part, fourth reflection unit, and fifth reflection unit. The calculating unit, with the rotation of the diffraction unit, calculates the amount of change in the angle based on the change in the interference signal caused by the combined light generated on the light receiving surface.

8 Claims, 10 Drawing Sheets

OPTICAL ANGLE SENSOR

CROSS-REFERENCE TO RELATED APPLICATION

This non-provisional application claims priority under 35 U.S.C. § 119(a) from Japanese Patent Application No. 2019-103771, filed on Jun. 3, 2019, the entire contents of which are incorporated herein by reference.

BACKGROUND

Technical Field

The present invention relates to an optical angle sensor.

Background Art

Conventionally, an optical angle sensor including a light source that emits light, a light receiving unit that receives the light from the light source, and a calculation unit that calculates an amount of change in an angle due to rotation of a measurement target has been known.

For example, a two-dimensional angle sensor according to JP 2003-156319A includes a light source for emitting a light beam to the detection target, a lens provided in the optical path of the light reflected from the detection target by the light beam, and a detection element (light receiving means) using a photodiode provided in the vicinity of the focal point of the lens. The two-dimensional angle sensor detects the angle of the detection target by calculating the photocurrent detected by the detection element.

Specifically, the two-dimensional angle sensor detects the angle of the detection target from the shape of the light emitted to the detection element and the magnitude of the light amount. When the shape of the light emitted to the detecting element and the magnitude of the light amount change due to a lens or the like, the change may affect the detection result as noise. Therefore, the two-dimensional angle sensor needs to include high-quality and expensive optical components such as a lens in order to suppress noise, and there is a problem that the cost of the angle sensor is high.

To deal with such a problem, for example, JP 11-237207 uses a laser interferometer. The laser interferometer measures the amount of change in the angle by the rotation of the measurement target by utilizing the interference of the laser beam. The laser interferometer includes a laser light source (light source) for emitting a laser beam, a first optical fiber for transmitting the laser beam emitted from the laser light source, a first optical fiber for transmitting the laser beam emitted from the laser light source, a first lens for collimating the laser beam from the first optical fiber, a polarization beam splitter for rotation angle detection, which divides the laser beam collimated by the first lens, passes through two corner cubes, and combines the divided laser beams, a polarizing plate that polarizes the laser beam emitted from the polarization beam splitter for rotation angle detection, a second lens that converges the laser beam to an end face of the second optical fiber that transmits the laser beam through the polarizing plate, and a light receiving signal processing unit (receiving unit and operation unit) for converting a laser beam through the two optical fibers into an electric signal.

The laser light source is a He—Ne laser that emits a laser beam with good coherency of the electric signal detected by the light receiving signal processor. Then, the laser beam emitted to the light receiving signal processing unit through the polarizing beam splitter for rotation angle detection causes interference at the irradiation surface to which the laser beam is irradiated in the light receiving signal processing unit. The laser interferometer can measure the amount of change in the angle due to the rotation of the measurement target by converting the intensity change of the interference signal caused by the change in the optical path length due to the rotation into an electrical signal by the light receiving signal processing unit and performing calculation.

Specifically, when the two corner cubes provided with the laser interferometer rotate, the difference in the optical path length of the two laser beams divided by the polarizing beam splitter for rotation angle detection is changed, light and darkness of the interference light (combined light), i.e., the change in the intensity of the interference signal is observed. At this time, the change in the optical path length difference is twice the length obtained by multiplying the arrangement distance of the two corner cubes by the rotation angle. The laser interferometer can measure the rotation of the two corner cubes by detecting the intensity change of the interference signal. Therefore, since the laser interferometer performs the detection regardless of the shape of the light and the magnitude of the light amount, the rotation angle of the measurement target can be detected even without a high-quality and expensive optical component such as a lens. Incidentally, the same effect can be obtained even if the polarizing beam splitter for rotation angle detection is replaced with a diffraction grating.

SUMMARY OF THE INVENTION

Problems to be Solved by the Invention

Here, the wavelength of the light emitted from the light source in the optical angle sensor (hereinafter, sometimes referred to as the light source wavelength) may vary with changes in environment such as temperature and humidity. The laser interferometer described in JP 11-237207 detects the amount of change in angle based on the difference in the optical path length of the two laser beams caused by rotating the two corner cubes.

Specifically, the light receiving signal processing unit detects change in phase from the interference signal that varies due to the difference in the optical path length of the two laser beams, and detects the amount of the change in the angle due to rotation of the measurement target based on the change in phase. The phase detected from the interference signal is based on the light source wavelength. Thus, when the light source wavelength changes, the phase also changes.

Therefore, when the light source wavelength changes due to a change in the environment, the laser interferometer (optical angle sensor) may not be possible to accurately detect the amount of change in the angle from the change in the interference signal based on a change in the difference in the optical path length in the two laser beams, and thereby the a detection error may occur.

Further, when the light source wavelength changes, the following problems also occur.

FIGS. 10A to 10C illustrate a conventional optical angle sensor 100. Specifically, FIG. 10A illustrates an optical path of the light observed by the optical angle sensor 100 when the light source wavelength is 660 nm. FIG. 10B illustrates an optical path of the light observed by the optical angle sensor 100 when the light source wavelength is 630 nm. FIG. 10C illustrates an optical path of the light observed by the optical angle sensor 100 when the light source wavelength is 690 nm. In FIGS. 10A to 10C, the optical paths of the lights are indicated by solid arrows.

As shown in FIG. 10A, the optical angle sensor 100 includes a diffraction grating 200, a light source 300, a light receiving unit 400 for receiving light from the light source 300 through the diffraction grating 200, and two corner cubes 500.

When the light source wavelength is 660 nm, two lights emitted from the light source 300 and divided by the diffraction grating 200 are diffracted at a diffraction angle θ. Then, the two lights are again irradiated on the diffraction grating 200 via the two corner cubes 500, and are diffracted by the diffraction grating 200 and irradiated on the light receiving unit 400 as one combined light in which the two lights overlap.

Then, when the light source wavelength changes, as shown in FIGS. 10B and 10C, the optical paths of the lights indicated by the solid line arrows in the optical angle sensor 100 also change.

Specifically, as shown in FIG. 10B, when the light source wavelength is 630 nm, two lights emitted from the light source 300 and divided by the diffraction grating 200 are diffracted at a diffraction angle θ1 smaller compared to the diffraction angle θ in FIG. 10A at the light source wavelength 660 nm. The two lights diffracted at the diffraction angle θ1 are irradiated to the light receiving unit 400 through two corner cubes 500 in a state of having a distance S1 offset from each other.

Specifically, as shown in FIG. 10C, when the light source wavelength is 690 nm, two lights emitted from the light source 300 and divided by the diffraction grating 200 are diffracted at a diffraction angle θ2 larger compared to the diffraction angle θ in FIG. 10A at the light source wavelength 660 nm. The two lights diffracted at the diffraction angle θ2 are irradiated to the light receiving unit 400 through two corner cubes 500 while being offset from each other and having a distance S2.

At this time, in the combined light irradiated to the light receiving unit 400 in FIGS. 10B and 10C, the amount of overlap of the two lights is smaller than that when the light source wavelength is 660 nm shown in FIG. 10A. That is, in the optical angle sensor 100 when the light source wavelength is 630 nm or 690 nm shown in FIGS. 10B and 10C, the interference light generated in the light receiving 400 is smaller compared with the optical angle sensor 100 when the light source wavelength is 660 nm shown in FIG. 10A, and accordingly the amplitude of the interference signal that can be acquired is attenuated. Therefore, when the light source wavelength changes due to changes in the environment, there is a problem that it is impossible to detect stably, since the amount of overlap of the combined light irradiated to the light receiving unit 400 changes.

An object of the present invention is to provide an optical angle sensor capable of detecting an amount of change in an angle due to rotation of a measurement target with high accuracy while stabilizing an overlap amount of a combined light irradiated to a light receiving unit, even if the light source wavelength is changed due to changes in the environment.

Means for Solving the Problems

An optical angle sensor of the present invention includes a diffraction unit having a diffraction grating disposed at a predetermined period along the measurement direction, a light source for irradiating light toward the diffraction unit, a light receiving unit for receiving light through the diffraction unit, and a calculating unit for calculating the amount of change in the angle of a measurement target which rotates around a predetermined axis as a rotation axis based on the light received by the light receiving unit. The optical angle sensor comprises a plurality of reflection units that are irradiated by the light source and reflect light through the diffraction unit toward the diffraction unit. The diffraction unit is attached to the measurement target, and rotates in synchronism with the rotation of the measurement target. The diffraction unit comprises: a first diffraction part that divides and diffracts the light from the light source into a first light and a second light different from the first light, and diffracts and combines the first light and the second light through the plurality of reflection units into a combined light to be received by the light receiving unit; and a second diffraction part that diffracts and emits the first light and the second light through the plurality of reflection units to the plurality of reflection units, and diffracts and emits the first light and the second light reflected by the plurality of reflection units that are incident in the opposite direction to the case of emission to the plurality of reflection units. The plurality of reflection units comprises: a first reflection unit for reflecting the first light divided and diffracted by the first diffraction part toward the second diffraction part in a direction parallel to and opposite to the direction in which the first light is incident; a second reflection unit for reflecting the second light divided and diffracted by the first diffraction part toward the second diffraction part in a direction parallel to and opposite to the direction in which the second light is incident; a third reflection unit for reflecting the first light and the second light through the second diffraction part toward the second diffraction part; a fourth reflection unit for reflecting the first light diffracted by the second diffraction part toward the first diffraction part in a direction parallel to and opposite to the direction in which the first light is incident; and a fifth reflection unit for reflecting the second light diffracted by the second diffraction part toward the first diffraction part in a direction parallel to and opposite to the direction in which the second light is incident. The receiving unit includes a light receiving surface to which the combined light is irradiated The calculating unit, with the rotation of the diffraction unit, calculates the amount of change in the angle based on the change in the interference signal caused by the combined light generated on the light receiving surface.

According to the present invention, the optical angle sensor rotates the diffraction unit having a diffraction grating in synchronization with the rotation of the measurement target. The optical angle sensor includes a plurality of reflecting units in a fixed manner. That is, conventionally, a change in an interference signal based on a difference between optical path lengths of two lights with respect to a light source wavelength, which is caused by rotating a plurality of reflecting units, has been detected. According to the present invention, a change in the interference signal based on a predetermined period (graduation) of a diffraction grating caused by rotating the diffraction unit while fixing a plurality of reflection units is detected, and the amount of change in the angle therefrom. The predetermined period of the diffraction grating does not vary significantly like the light source wavelength even if there is a change in the environment. Therefore, the optical angle sensor can detect the amount of change in the angle due to rotation of the measurement target with high accuracy from the change in the interference signal based on the predetermined period of the diffraction grating, even if the light source wavelength changes due to changes in the environment.

Further, according to the present invention, since the optical angle sensor includes the first reflection unit, the second reflection unit, the fourth reflection unit, and the fifth reflection unit which reflect the light in a direction parallel to and opposite to the direction in which the first light is incident, and the third reflection unit which reflects the first light and the second light through the second diffraction part in the diffraction unit and irradiates the second diffraction part again, it is possible to cancel the variation of the traveling angle of the diffracted light due to the variation of the diffraction angle caused by the change of the light source wavelength. Specifically, by passing through the third reflecting unit, the diffraction unit diffracts the light from the light source twice when it divides and combines the light and twice in the second diffraction part, that is, four times in total. The optical angle sensor cancels the variation of the traveling angle of the diffracted light due to the change of the light source wavelength by diffracting the light from the light source four times. Accordingly, the optical angle sensor can suppress the first light and the second light constituting the combined light irradiated to the light receiving unit from being offset and the overlap amount from being reduced.

Therefore, the optical angle sensor can stabilize the amount of overlap of the combined light irradiated to the light receiving unit, even if the light source wavelength is changed by the change of the environment.

At this time, it is preferable that the first reflection unit and the fourth reflection unit are the same member, and the second reflection unit and the fifth reflection unit are the same member.

According to such a configuration, it is possible to reduce the cost and miniaturize the optical angle sensor, since it is not necessary to prepare a respective member and adjust the arrangement of the individual member.

In this case, it is preferable that the third reflection unit is a single member that reflects the first light and the second light toward the second diffraction part.

According to such a configuration, it is possible to reduce the cost and miniaturize the optical angle sensor, since the third reflection unit is a single member and it is not necessary to prepare the third reflection unit as a plurality of members corresponding to the first light and the second light.

At this time, the plurality of reflection units further include a sixth reflection unit that reflects the light from the light source toward the first diffraction part, and reflects the combined light toward the light receiving unit.

According to such a configuration, the optical path of the light in the optical angle sensor can be freely designed, since the plurality of reflection units further includes sixth reflection unit for reflecting the light from the light source toward the first diffraction part and reflecting the combined light toward the light receiving unit. Further, it is possible to miniaturize the optical angle sensor by the arrangement of the sixth reflection unit.

In this case, it is preferable that the third reflection unit is a prism.

Here, it is preferable that additional variation in the traveling angle of the light does not occur at the third reflection unit, since the third reflection unit is for diffracting the light from the light source four times by the diffraction unit to cancel the variation in the traveling angle of the light caused by the variation of the environment. Further, for example, when the third reflection unit is a mirror, which reflects the light incident from the diffraction unit in the opposite direction without being offset, problems such as interference between the incident light and the emitted light and the necessity of disposing the light source and the light receiving unit at the same position may occur.

On the other hand, a prism is an optical component that, unlike a mirror, retroreflects light in a direction parallel to and opposite to the direction in which the light is incident. At this time, the light incident on the prism is reflected twice in the prism while maintaining the traveling angle in a specific direction, is offset in a predetermined direction, and is emitted in a direction parallel to and opposite to the incident light.

Therefore, according to such a configuration, since the third reflection unit is the prism, the light incident from the diffraction unit can be offset in a predetermined direction without causing an additional variation in the traveling angle of the light and irradiate on the diffraction unit. Therefore, it is possible to stabilize the combined light received by the light receiving unit and improve the degree of freedom in designing the optical angle sensor.

At this time, it is preferable that the first reflection unit and the second reflection unit are arranged at positions where the difference between the optical path length of the first light from the division point of the light from the light source in the first diffraction part to the combined point for generating the combined light in the first diffraction part via the first reflection unit, the third reflection unit and the fourth reflection unit and the optical path length of the second light from the division point of the light from the light source in the first diffraction part to the combined point for generating the combined light in the first diffraction part via the second reflection unit, the third reflection unit and the fifth reflection unit is within the coherent length range of the light source.

Here, in the laser interferometer described in JP 11-237207, the difference in the optical path lengths of the two laser beams divided by the polarization beam splitter for rotation angle detection is twice the length obtained by multiplying the arrangement distance of the two corner cubes by the rotation angle. A laser included in the laser interferometer is an He—Ne laser and a coherent length thereof is a several meters. Thus, even when optical lengths of two laser beams are significantly different from each other, interference light can be generated on an illumination surface of a light receiving signal processing unit.

However, for example, in a case where a semiconductor laser in which a coherent length is very short and is a several centimeters is used as a light source, interference light is not generated on the illumination surface of the light receiving signal processing unit. Therefore, when a semiconductor laser is used as the light source, the laser interferometer may not be able to measure the measurement target due to the restriction by its very short coherent length. In addition, He—Ne lasers are expensive and costly.

However, according to the configuration of the present invention described above, it is possible to reliably cause interference light within the restriction by the coherency of the light source. And, for example, by arranging the first reflection unit and the second reflection unit such that the optical path length of the first light and the optical path length of the second light are the same length when the diffraction unit is at a predetermined position, even if a semiconductor laser is used, the interference light can be generated by keeping the difference between the optical path length of respective light within several cm, which is coherent length.

Thus, the optical angle sensor can use a semiconductor laser or the like, which is inexpensive as compared to a He—Ne laser and has a strict coherence restriction, as a light source, instead of an expensive He—Ne laser or the like while avoiding the restriction by the coherence of the light source 3, and thereby, the cost can be reduced.

In this case, the optical angle sensor preferably includes a first quarter-wave plate arranged on one or more optical paths of first light via the first reflection unit, the second light via the second reflection unit, the first light via the fourth reflection unit and the second light via the fifth reflection unit. The optical angle sensor may include: a dividing beam splitter that divides combined light into a first divided light and a second divided light; a second quarter-wave plate arranged in an optical path of each of the first divided light and the second divided light divided by the dividing beam splitter; a first divided light polarizing beam splitter that divides the first divided light through the second quarter-wave plate into first polarized light and second polarized light; a third quarter-wave plate arranged in an optical path of the second divided light through the second quarter-wave plate; and a second divided light polarizing beam splitter that divides the second divided light through the third quarter-wave plate into third polarized light and fourth polarized light. The light receiving unit may include: a first light receiving unit that receives light having a phase of zero degrees from the first polarized light; a second light receiving unit that receives light having a phase of 180 degrees from the second polarized light; a third light receiving unit that receives light having a phase of 90 degrees from the third polarized light; and a fourth light receiving unit that receives light having a phase of 270 degrees from the fourth polarized light. It is preferable that the calculating unit calculates the direction of rotation of the measurement target and the amount of change in the angle due to the rotation of the measurement target based on the plurality of lights having phases different from each other received by the first light receiving unit, second light receiving unit, third light receiving unit, and fourth receiving unit.

According to such a configuration, since the optical angle sensor includes a first quarter-wave plate arranged in one or more optical paths of the first light and the second light through the plurality of reflection units, and the light receiving unit includes the first light receiving unit that receives light having a phase of zero degrees, second light receiving unit that receives light having a phase of 180 degrees, the third light receiving unit that receives light having a phase of 90 degrees, and the fourth light receiving unit that receives light having a phase of 270 degrees, the optical angle sensor can detect four-phase signal from the combined light. Therefore, the optical angle sensor can acquire, for example, a four-phase signal from a plurality of diffracted lights and detect the displacement of the angle due to the rotation of the measurement target with high accuracy.

Alternatively, the optical angle sensor preferably includes a quarter-wave plate arranged on one or more optical path of first light via the first reflection unit, the second light via the second reflection unit, the first light via the fourth reflection unit and the second light via the fifth reflection unit. The optical angle sensor may include: a second diffraction unit having an illumination surface to which the combined light is irradiated, and a diffraction grating that is provided along a predetermined direction and that makes the combined light into a plurality of diffracted lights; a third diffraction unit having a diffraction grating provided along a direction perpendicular to a predetermined direction along which the diffraction grating of the second diffraction unit is provided, and further making the plurality of diffracted lights by the second diffracting unit into a plurality of diffracted lights; and a plurality of polarizers arranged on the optical paths of plurality of diffracted lights by the third diffraction unit and making the plurality of diffracted lights into a plurality of polarized lights having phases different from each other. It is preferable that the light receiving unit includes a plurality of light receiving units corresponding to each of the plurality of polarizers, and the calculating unit calculates the rotation direction of the measurement target and the amount of change in the angle due to the rotation of the measurement target based on the plurality of lights having phases different from each other received by the plurality of light receiving units.

According to such a configuration, since the optical angle sensor includes a quarter-wave plate arranged on one or more optical paths of the first light and the second light via the reflection units, a plurality of polarizers corresponding to the plurality of diffracted lights diffracted by the second diffraction unit and the third diffraction unit, and a plurality of light receiving units corresponding to the plurality of polarizers, compared to the case where the dividing beam splitter, the first divided light polarizing beam splitter, and the second divided light polarizing beam splitter described above are provided, for example, a four-phase signal can be acquired without using these optical components. Thus, the optical angle sensor can reduce a space or a cost while improving accuracy compared to the above-described optical angle sensor.

DETAILED DESCRIPTION OF THE EMBODIMENTS

First Embodiment

In the following, the first embodiment of the present invention will be described based on FIG. 1 to FIG. 4C.

Figure 1:
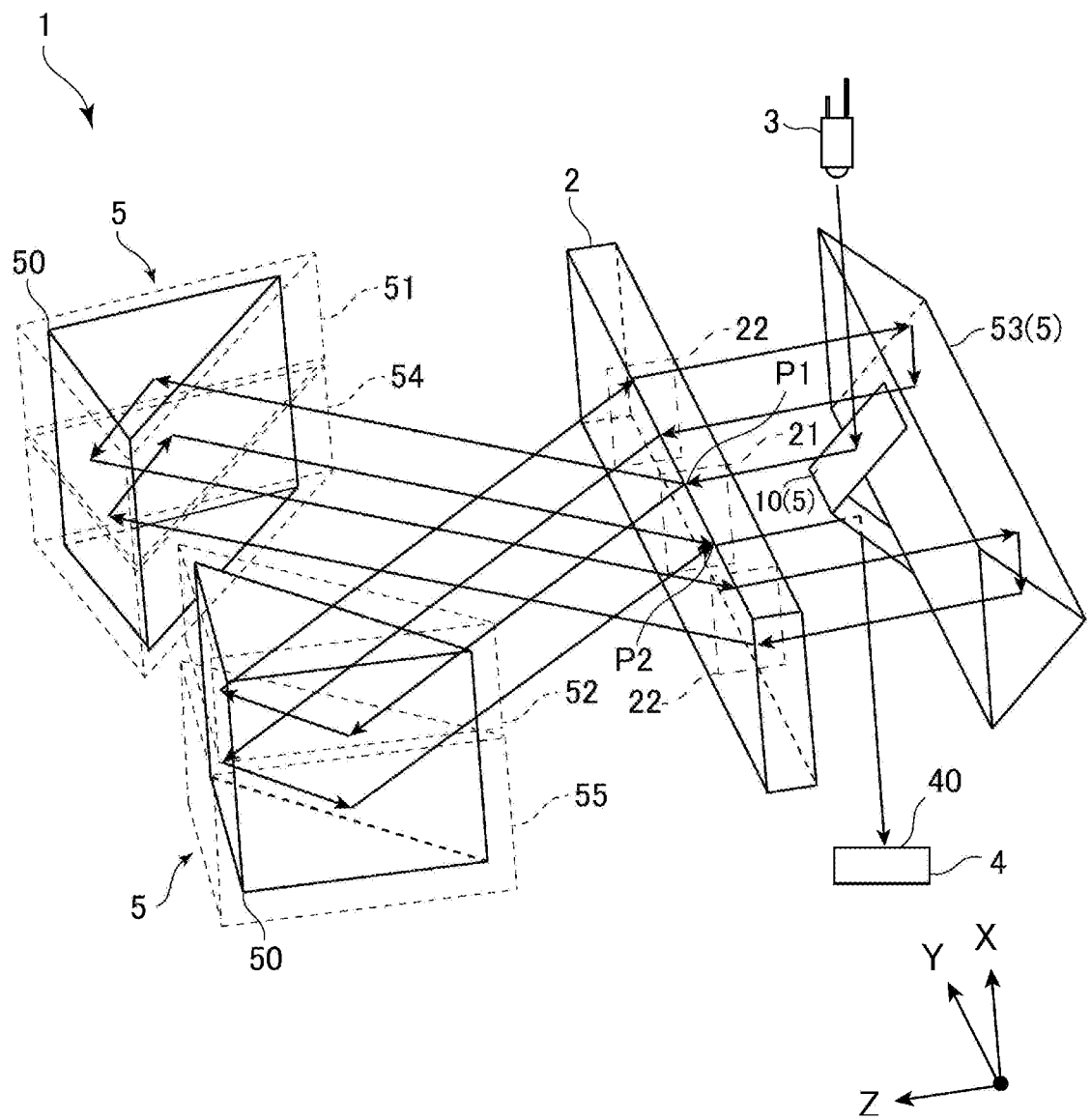
FIG. 1 is a perspective view showing an optical angle sensor according to the first embodiment.
Figure 2A:
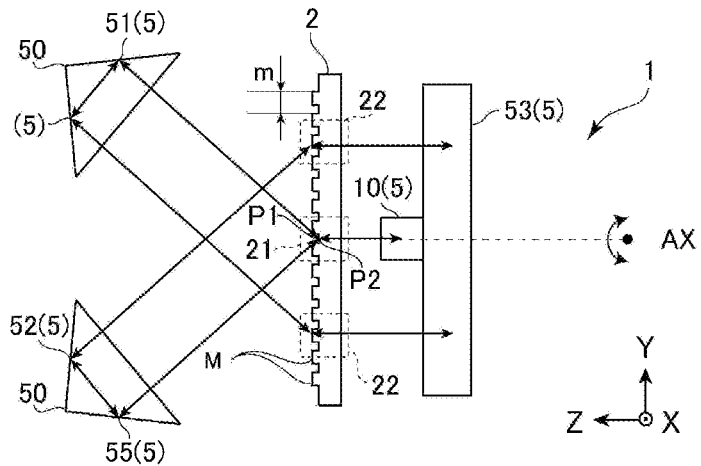
FIGS. 2A to 2C are schematic diagrams illustrating the optical paths of the light in the optical angle sensor.
Figure 2B:
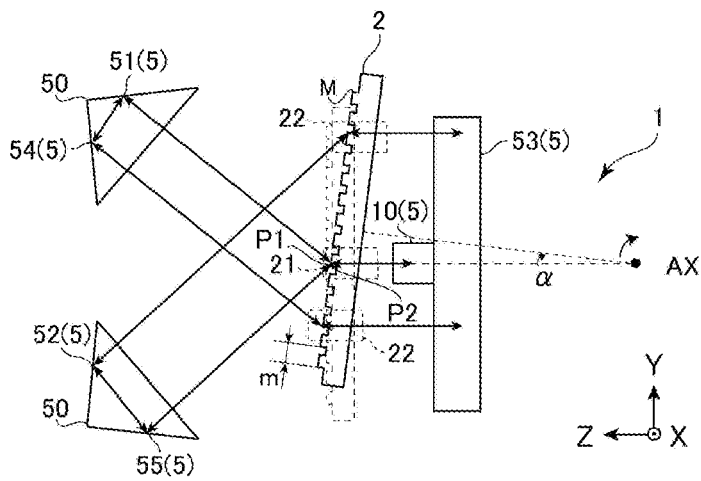
Figure 2C:
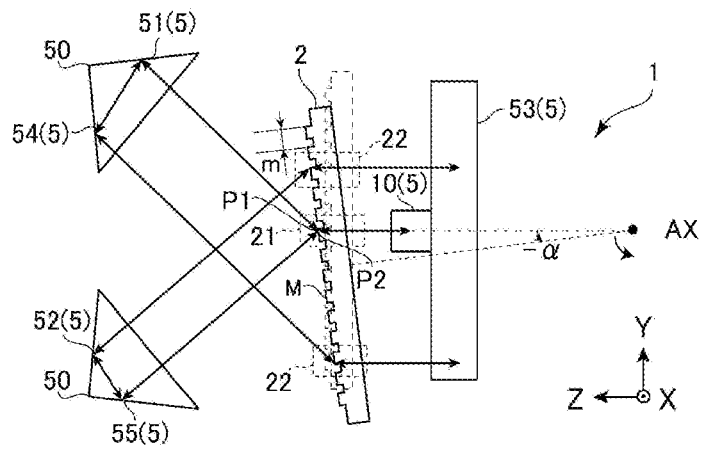

FIG. 1 is a perspective view illustrating an optical angle sensor 1 according to the first embodiment. FIGS. 2A to 2C are schematic diagrams illustrating optical paths of light in the optical angle sensor 1. Specifically, FIG. 2A is a diagram showing a state before the measurement target is rotated in the optical angle sensor 1. FIGS. 2B and 2C are diagrams showing states in which the measurement target is rotated in a predetermined direction in the optical angle sensor 1.

As shown FIG. 1 and FIGS. 2A to 2C, the optical angle sensor 1 includes a diffraction unit 2 having a diffraction grating M, a light source 3 for irradiating light toward the diffraction unit 2, a light receiving unit 4 for receiving light through the diffraction unit 2, and a plurality of reflection units 5 that are irradiated by the light source and reflect the light through the diffraction unit 2 toward the diffraction unit 2.

The optical angle sensor 1 is provided inside the measuring instrument for measuring the measurement target (not shown) to be rotated. In the present embodiment, the measurement target rotates with an X axis as the rotation axis AX. In the following description, the X-axis may be described as the rotation axis AX of the measurement target. For convenience of description, the diffraction grating M is omitted in FIG. 1 and is illustrated in FIGS. 2A to 2C.

The diffraction unit 2 is a transmissive-type diffraction grating, and is formed of a translucent glass. Note that the diffraction unit 2 is not limited to glass, and may be formed of any translucent member. The diffraction unit 2 is attached to the measurement target to be rotated with the X-axis as the rotation axis AX, rotates in synchronization with the rotation of the measurement target.

The diffraction grating M, in the present embodiment, is arranged at a predetermined period m along the Y direction as the measurement direction. The light from the light source 3 through the diffraction grating M is a plurality of diffracted lights.

Here, the plurality of diffracted lights include a diffracted light that travels in a direction that is the same as an optical axis of light emitted from the light source 3, a diffracted light that travels in a predetermined diffraction angle on both sides of the optical axis, and a diffracted light that travels in a diffraction angle larger than the predetermined diffraction angle on the both sides of the optical axis.

When diffracted light that travels in the same direction as the optical axis is zero-order diffracted light, the plurality of diffracted lights can be ordered as ±first-order diffracted light and ±second-order diffracted light in a direction in which a diffraction angle becomes large with the zero-order diffracted light as a reference.

The light receiving unit 4 detects an interference signal from combined light generated mainly by the ±first-order diffracted light.

Note that in the following description and drawings, solid line arrows may indicate optical paths of light that generates the combined light on the light receiving unit 4.

The diffraction unit 2 includes a first diffraction part 21 that divides and diffracts the light from the light source 3 into first light and second light different from the first light, and diffracts and combines the first light and the second light through the plurality of reflection units 5 into a combined light to be received by the light receiving unit 4 and a second diffraction part 22 that diffracts and emits the first light and the second light through the plurality of reflection units 5 to the plurality of reflection units 5, and diffracts and emits the first light and the second light reflected by the plurality of reflection units 5 that are incident in the opposite direction to the case of emission to the plurality of reflection units 5.

The first diffraction part 21 and the second diffraction part 22 are provided side by side in one diffraction unit 2. Specifically, of the diffraction grating M provided in one diffraction unit 2, the first diffraction part 21 is a diffraction grating M that is provided in the region where the light from the light source 3 is irradiated and the first light and the second light via the plurality of reflection units 5 and the second diffraction part 22 are irradiated. Of the diffraction grating M provided in one diffraction unit 2, the second diffraction part 22 is a diffraction grating M provided in the region where the first light and the second light through the plurality of reflecting units 5 are irradiated. Noted that the diffraction unit 2 may not be a single member, but may be a plurality of members. In such a case, the first diffraction part 21 and the second diffraction part 22 may be provided separated into each of a plurality of diffraction units.

The light source 3 emits light having a certain width toward the diffraction unit 2. The light source 3 is, for example, a semiconductor laser. Note that the light source 3 is not limited to a semiconductor laser and only needs to be a light source with coherent length at which interference light can be generated in the optical angle sensor.

The receiving unit 4 has a light receiving surface 40 to which the combined light is irradiated. A PDA (Photo Diode Array) is used as the light receiving unit 4. The PDA is an optical receiver that has a property of being able to measure combined light, which is emitted to a light receiving surface thereof, at once. The light receiving unit 4 are not limited to the PDA, and any light receiving device such as a PSD (Position Sensitive Detector) or a CCD (Charge-Coupled Device) may be used.

The plurality of reflection units 5 include a first reflection unit 51, a second reflection unit 52, a third reflection unit 53, a fourth reflection unit 54, a fifth reflection unit 55, and a sixth reflection unit 10, which are provided fixed in the optical angle sensor 1 without rotating.

Each of the plurality of reflection units 5 excluding the third reflection unit 53 and the sixth reflection unit 10 is a prism having two reflecting surfaces that are orthogonal to each other, and a linear orthogonal portion 50 generated by making the two reflecting surfaces orthogonal to each other is arranged so as to be parallel to the X axis which is the rotation axis AX of the measurement target and the diffraction unit 2. Note that each of the plurality of reflection units 5 excluding the third reflection unit 53 and the sixth reflection unit 10 does not have to be a prism, and may be, for example, a corner cube in which three plate-like bodies that reflect light are combined at right angles to each other into a substantially cubic shape, or a cat's eye using spherical beads, if it is possible to reflect light in the opposite direction.

The first reflection unit 51 reflects the first light divided and diffracted by the first diffraction part 21 toward the second diffraction part 22 in a direction parallel to and opposite to the direction in which the first light is incident.

The second reflection unit 52 reflects the second light divided and diffracted by the first diffraction part 21 toward the second diffraction part 22 in a direction parallel to and opposite to the direction in which the second light is incident.

The third reflection unit 53 reflects the first light and the second light through the second diffraction part toward the second diffraction part.

The fourth reflection unit 54 reflects the first light diffracted by the second diffraction part 22 toward the first diffraction part 21 in a direction parallel to and opposite to the direction in which the first light is incident.

The fifth reflection unit 55 reflects the second light diffracted by the second diffraction part 22 toward the first diffraction part 21 in a direction parallel to and opposite to the direction in which the second light is incident.

The first reflection unit 51 and the fourth reflection unit 54 are the same member, and the second reflection unit 52 and the fifth reflection unit 55 are the same member. That is, the first reflection unit 51 and the fourth reflection unit 54 are provided in the same prism. Similarly, the second reflection unit 52 and the fifth reflection unit 55 are provided in the same prism. The first reflection unit 51 and the fourth reflection unit 54 may not be the same member, and the second reflection unit 52 and the fifth reflection unit 55 may not be the same member. Each reflection unit may be individually provided in the optical angle sensor 1.

The third reflection unit 53 is a single member that reflects the first light and the second light toward the second diffraction part 22. The third reflection unit 53 is a prism having two reflecting surfaces that are orthogonal to each other. Instead, the third reflection unit 53 may be a mirror. The reason why the third reflection unit 53 is preferably a prism will be described later.

The sixth reflection unit 10 reflects the light from the light source 3 toward the first diffraction part 21, and reflects the combined light toward the light receiving unit 4. The sixth reflection unit 10 is one member by combining two mirrors. Incidentally, the sixth reflection unit 10 does not have to be mirrors, and as long as it can reflect the light from the light source 3 toward the first diffraction part 21 and reflect the combined light toward the light receiving unit 4, any member such as a half mirror or a beam splitter can be used. The sixth reflection unit 10 may not be a single member, but may be a plurality of members.

The first reflection unit 51 and the second reflection unit 52 are arranged at positions where the difference between the optical path length of the first light from the division point P1 of the light from the light source 3 in the first diffraction part 21 to the combined point P2 for generating the combined light in the first diffraction part 21 via the first reflection unit 51, the third reflection unit 53 and the fourth reflection unit 54 and the optical path length of the second light from the division point P1 of the light from the light source 3 in the first diffraction part 21 to the combined point P2 for generating the combined light in the first diffraction part 21 via the second reflection unit 52, the third reflection unit 53 and the fifth reflection 55 unit is within the coherent length range of the light source 3.

Specifically, in the present embodiment, since the coherent length of the light source 3 which is a semiconductor laser is several cm, the first reflection unit 51 and the second reflection unit 52 are arranged at positions where the optical path length of the first light from the division point P1 of the light from the light source 3 in the first diffraction part 21 to the combined point P2 via the plurality of reflection units 5 and the second diffraction part 22 and the optical path length of the second light from the division point P1 of the light from the light source 3 in the first diffraction part 21 to the combined point P2 via the reflection units 5 and the second diffraction part 22 are the same length when the diffraction unit 2 is in a predetermined position.

Here, as shown in FIG. 2A, the predetermined position of the diffraction unit 2 is, for example, a position where the light emitted from the light source 3 and the surface of the diffraction unit 2 on which the diffraction grating M is provided are perpendicular to each other. The predetermined position of the diffraction unit 2 may be an end portion of the diffraction unit 2, or may be an arbitrary position.

Further, in the present embodiment, the first reflection unit 51 and the fourth reflection unit 54, and the second reflection unit 52 and the fifth reflection unit 55 are arranged at positions plane-symmetrical with respect to the XZ plane defined by an X direction parallel to the rotation axis AX of the diffraction unit 2 and a Z direction perpendicular to a surface of the diffraction unit 2 on which the diffraction grating M is provided at the position shown in FIG. 2A. Incidentally, the first reflection unit 51 and the fourth reflection unit 54, and the second reflection unit 52 and the fifth reflection unit 55 do not have to be arranged at positions plane-symmetrical with respect to the XZ plane.

Figure 3:
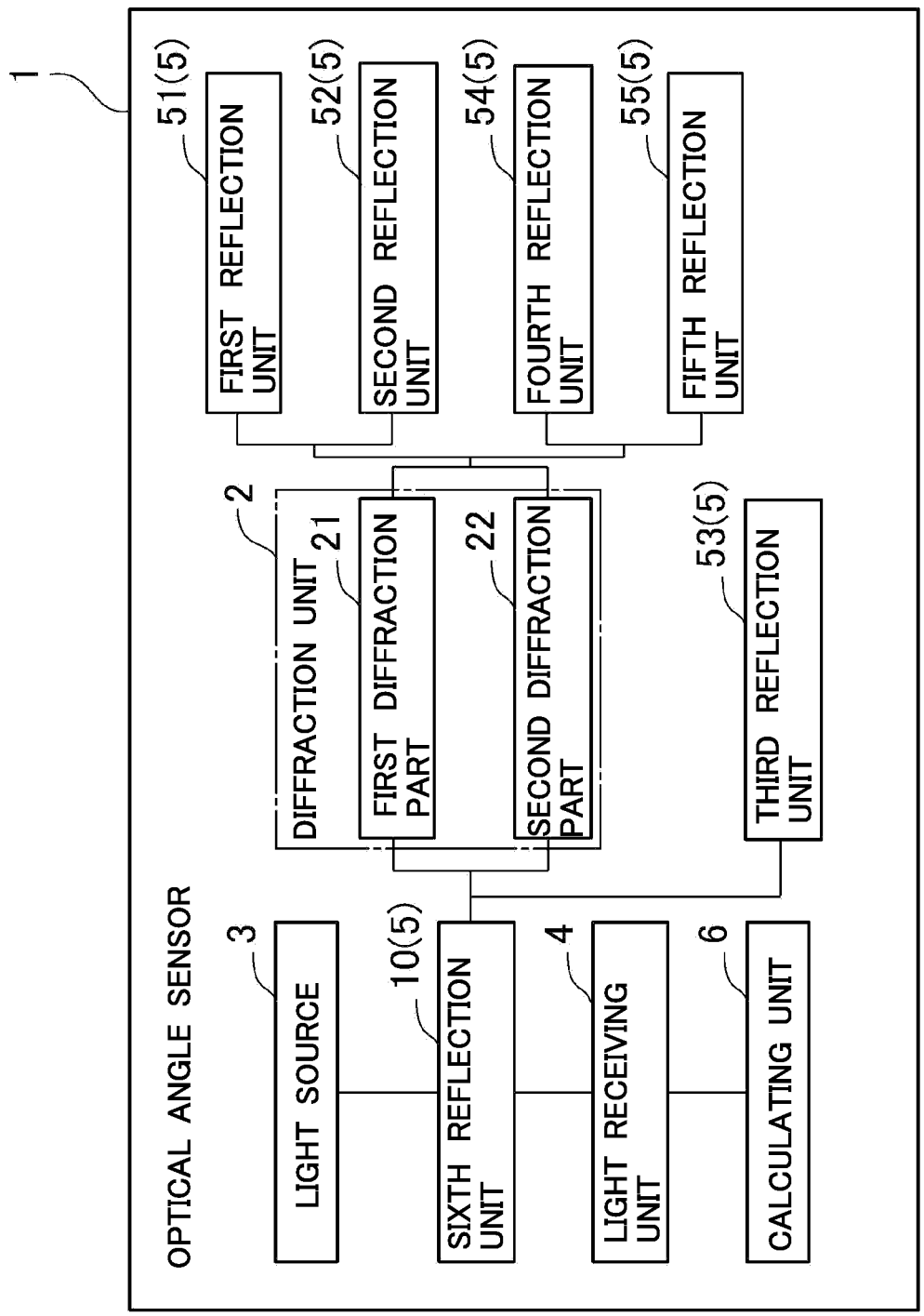
FIG. 3 is a block diagram illustrating the optical angle sensor.

FIG. 3 is a block diagram illustrating the optical angle sensor 1.

As shown in FIGS. 2A to 2C, the optical angle sensor 1 further comprises a calculating unit 6 that calculates the amount of change in the angle of the measurement target which rotates a predetermined axis as a rotation axis based on the light received by the light receiving unit 4.

The calculating unit 6, with the rotation of the diffraction unit 2, calculates the amount of change in the angle based on the change in the interference signal caused by the combined light generated on the light receiving surface 40. Specifically, the calculating unit 6, with the rotation of the diffraction unit 2, calculates the amount of change in the angle based on change in phase detected from the interference signal caused by the combined light generated on the light receiving surface 40.

Here, an optical path of light in the optical sensor 1 will be described on the basis of FIGS. 2A to 2C.

First, as shown in FIG. 2A, the first light is divided and diffracted by the first diffraction part 21, is irradiated from the division point P1 on the first diffraction part 21 to the first reflection unit 51. The second light is divided and diffracted by the first diffraction part 21, is irradiated from the division point P1 on the first diffraction part 21 to the second reflection unit 52. At this time, as shown in FIG. 2B, when the measurement target is rotated in the a direction, the diffraction unit 2 is also rotated in the a direction in synchronization, the traveling angle of the first light and the second light also changes in response to the rotation of the diffraction unit 2 in the a direction. As shown in FIG. 2C, when the measurement target is rotated in the −α direction, the diffraction unit 2 is also rotated in the α direction in synchronization, the traveling angle of the first light and the second light also changes in response to the rotation of the diffraction unit 2 in the −α direction.

Next, the first reflection unit 51 and the second reflection unit 52 reflect the first light and the second light in a parallel and in the opposite direction toward the second diffraction part 22.

The first light and the second light diffracted by the second diffraction part 22 is emitted toward the third reflection unit 53. The first light and the second light emitted on the third reflection unit 53 is offset in the X direction, reflected toward the second diffraction part 22, and diffracted by the second diffraction part 22 again. Subsequently, the first light is irradiated from the second diffraction part 22 to the fourth reflection unit 54, and the second light is irradiated from the second diffraction part 22 to the fifth reflection unit 55. Then, the first light irradiated to the fourth reflection unit 54 and the second light irradiated to the fifth reflection unit 55 are reflected toward the first diffraction part 21, and are diffracted at the combined point P2 of the first diffraction part 21 to generate the combined light.

In FIGS. 2B and 2C, the position of the diffraction unit 2 in FIG. 2A before the measurement target rotates are illustrated by broken lines.

Figure 4A:
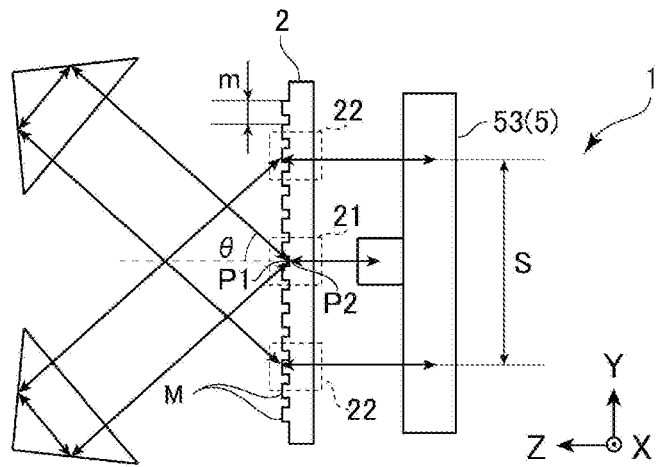
FIGS. 4A to 4C are schematic diagrams illustrating the optical paths of the light in the optical angle sensor.
Figure 4B:
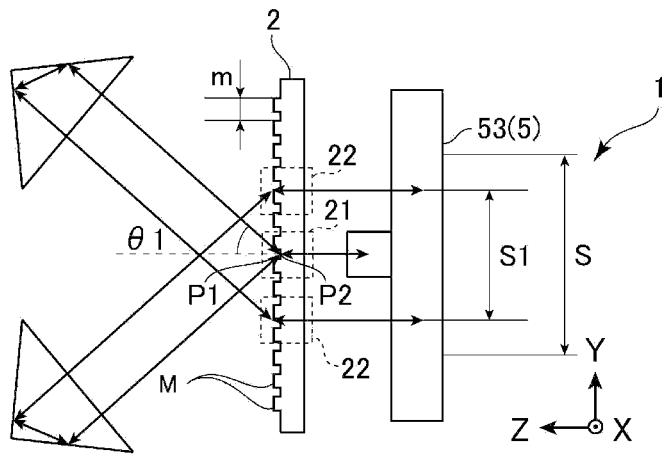
Figure 4C:
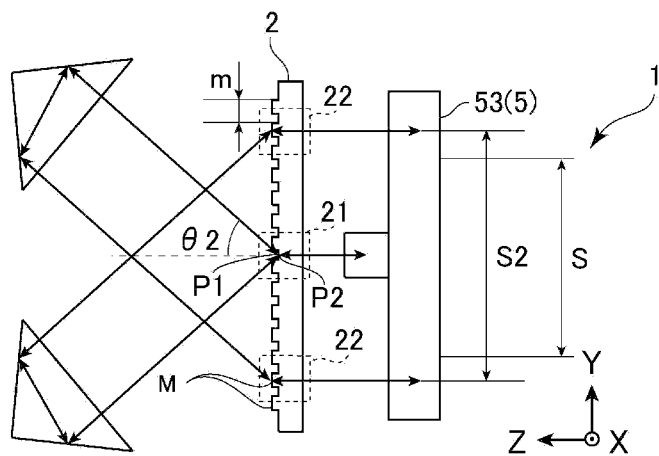

FIGS. 4A to 4C are schematic diagrams illustrating the optical paths of the light in the optical angle sensor 1. Specifically, FIG. 4A illustrates the optical angle sensor 1 when the light source wavelength is 660 nm. FIG. 4B illustrates the optical angle sensor 1 when the light source wavelength is 630 nm. FIG. 4C illustrates the optical angle sensor 1 when the light source wavelength is 690 nm.

As shown in FIG. 4A, when 660 nm is the optimum light source wavelength, the first light and the second light are irradiated to the third reflection unit 53 with a distance S. Then, when the light source wavelength varies due to changes in the environment, as shown in FIGS. 4B and 4C, the first light and are offset and irradiated to the third reflection with a distance S1 or S2 different from the distance S. By diffracting the first light and the second light having the offset distance S1 or S2 reaching the third reflection unit 53 by the diffraction unit 2 again, the optical angle sensor 1 cancels the decrease in the overlap amount caused by the influence of the offset distance S1 or S2.

Specifically, the optical angle sensor 1 cancels the variation of the traveling angle of the diffracted light due to the change of the light source wavelength by causing the first light and the second light to trace the same optical paths as the incident optical paths of the first light and the second light in the opposite directions through the third reflection unit 53, and to be diffracted by the diffraction unit 2 four times in total.

The third reflection unit 53 reflects the first light and second light diffracted by the second diffraction part 22 in the parallel and in the opposite direction so as to be irradiated to the second diffraction part 22 again. The first light and the second light are reflected by the fourth reflection unit and the fifth reflection unit 55 in a direction parallel to and opposite to the incident direction, trace the same optical paths as the optical paths of the first light and the second light in the opposite direction, and cause combined light at the first diffraction part 21. The combined light combined at the first diffraction part 21 travels on the same axis as the light emitted from the light source 3. That is, by diffracting light four times by the diffraction unit 2 through the reflection by the plurality of reflection units 5, the optical angle sensor 1 can cancel the influence of variations in the light source wavelength, suppress the occurrence of the offset between the first light and the second light that constituting the combined light, stabilize the overlap amount to prevent attenuation of the amplitude of the interference signal, and maintain a high efficiency.

However, for example, when the third reflection unit 53 is configured by a mirror and the first light and the second light are reflected without being offset in the X direction, the combined light travels on the same axis as the light source 3. As a result, the light receiving unit 4 cannot receive the combined light.

Therefore, as shown in FIG. 1, by configuring the third reflection unit 53 with a prism and reflecting the light with offset in the X direction, the light receiving unit 4 receives the combined light with a stable overlap amount in which the influence of the variation of the light source wavelength is suppressed. The third reflection unit does not have to offset the first light and the second light in the X direction. The third reflection unit may offset the light in any direction as long as the light receiving unit can receive the combined light. Therefore, the third reflection unit may be a mirror instead of a prism, and may be any member as long as it can reflect the first light and the second light through the second diffraction part 22.

According to such a first embodiment, the following functions and effects can be acquired.

(1) The optical angle sensor 1 detects a change in the interference signal with reference to a predetermined period m of the diffraction grating M obtained by rotating the diffraction unit 2 while fixing the plurality of reflection units, and detects an amount of change in the angle from the change in the interference signal. Therefore, the optical angle sensor 1 can detect the amount of change in the angle due to rotation of a measurement target with high accuracy from the change in the interference signal based on the predetermined period m of the diffraction grating M, even if the light source wavelength changes due to changes in the environment.

(2) By passing through the third reflecting unit 53, the diffraction unit 2 can diffracts the light from the light source 3 twice when it divides and combines the light and twice in the second diffraction part 22, that is, four times in total. The optical angle sensor cancels the variation of the traveling angle of the diffracted light due to the change of the light source wavelength by diffracting the light from the light source four times. Accordingly, the optical angle sensor 1 can suppress the first light and the second light constituting the combined light irradiated to the light receiving unit 4 from being offset and the overlap amount from being reduced. Therefore, the optical angle sensor 1 can stabilize the amount of overlap of the combined light irradiated to the light receiving unit 4, even if the light source wavelength is changed due to the change in the environment.

(3) Since the first reflection unit 51 and the fourth reflection unit 54 are the same member, and the second reflection unit 52 and the fifth reflection unit 55 are the same member, it is not necessary to prepare each member and adjust the arrangement individually. Therefore, the cost can be reduced and the optical angle sensor 1 can be miniaturized.

(4) Since the third reflection unit is a single member and it is not necessary to prepare the third reflection unit as a plurality of members corresponding to the first light and the second light, it is possible to reduce the cost and miniaturize the optical angle sensor.

(5) Since the plurality of reflection units 5 further includes sixth reflection unit 56 for reflecting the light from the light source 3 toward the first diffraction part 21 and reflecting the combined light toward the light receiving unit 4, the optical path of the light in the optical angle sensor 1 can be freely designed. Further, it is possible to miniaturize the optical angle sensor 1 by the arrangement of the sixth reflection unit 56.

(6) Since the third reflection unit 53 is the prism, the light incident from the diffraction unit 2 can be offset in the X direction without causing an additional variation in the traveling angle of the light and irradiate on the diffraction unit 2. Therefore, it is possible to stabilize the combined light received by the light receiving unit 4 and improve the degree of freedom in designing the optical angle sensor 1.

(7) By arranging the first reflection unit 51, the second reflection unit 52, the fourth reflection unit 54, and the fifth reflection unit 55 so that the optical path length of the first light and the optical path length of the second light are the same length when the diffraction unit 2 is at a predetermined position, the interference light can be reliably generated by keeping the difference between the optical path length of respective light within several cm, which is coherent length, even if the light source 3 is a semiconductor laser. Thus, the optical angle sensor can 1 use a semiconductor laser, which is inexpensive and has a strict coherence restriction, as a light source, instead of an expensive He—Ne laser while avoiding the restriction by the coherence of the light source 3, and thereby, the cost can be reduced.

Second Embodiment

In the following, the second embodiment of the present invention will be described on the basis of FIG. 5. In the following description, portions already described are denoted by the same reference numerals, and description thereof is omitted.

Figure 5:
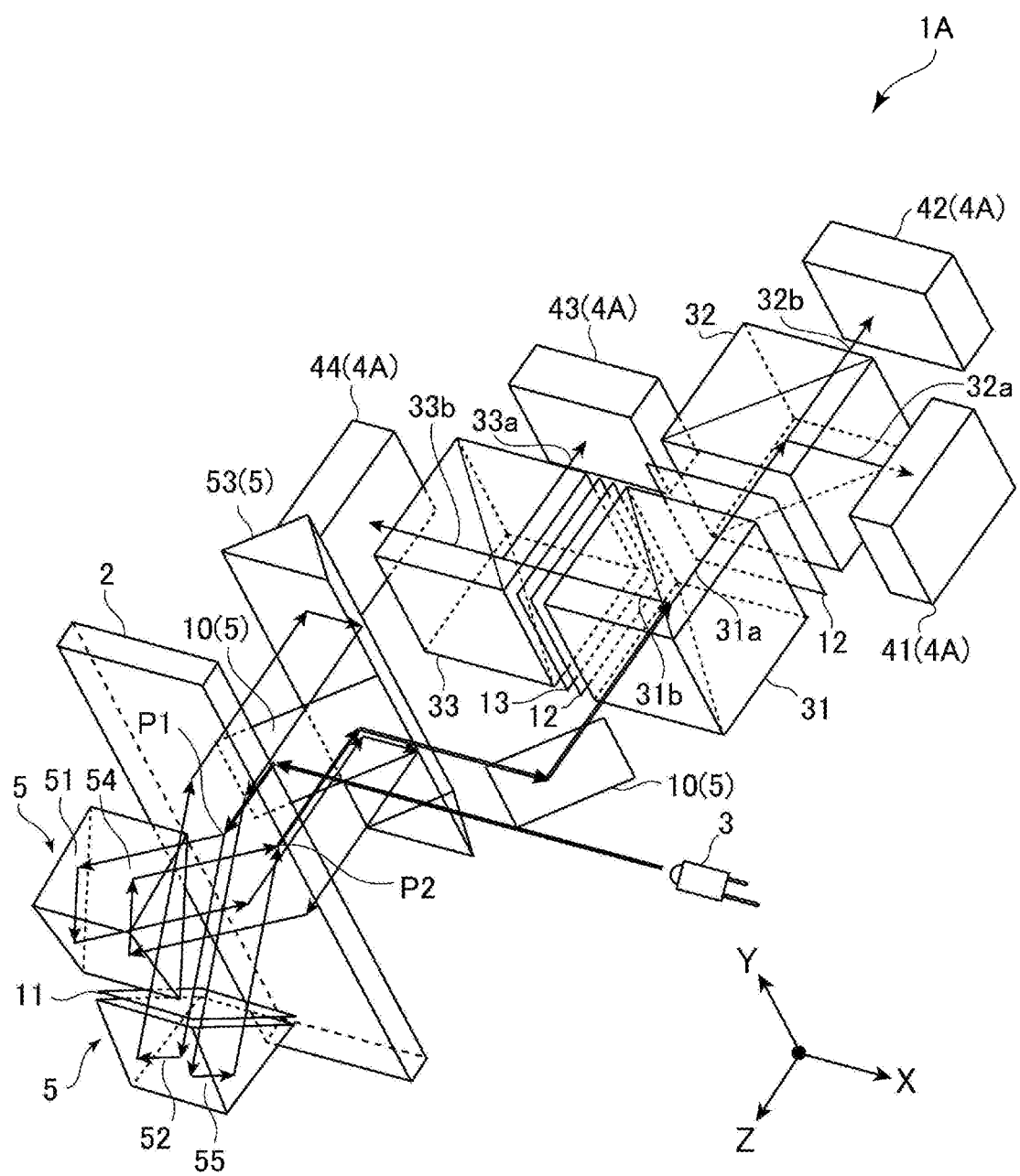
FIG. 5 is a schematic view illustrating an optical angle sensor according to the second embodiment.

FIG. 5 is a schematic view illustrating an optical angle sensor 1A according to the second embodiment.

In the first embodiment, the light receiving unit 4 receives the combined light, the calculating unit 6 calculates the amount of change in the angle due to the rotation of the measurement target based on the interference signal of the combined light received by the light receiving unit 4.

In the second embodiment, the optical angle sensor 1A has a substantially the same configuration as the optical angle sensor 1 in the first embodiment, except for the light receiving unit 4A.

The second embodiment is different from the first embodiment in that the optical angle sensor 1A includes: a first quarter-wave plate 11 arranged on one or more optical paths of first light via the first reflection unit 51, the second light via the second reflection unit 52, the first light via the fourth reflection unit 54 and the second light via the fifth reflection unit 55; a dividing beam splitter 31 that divides combined light into a first divided light 31a and a second divided light 31b; a second quarter-wave plate 12 arranged in an optical path of each of the first divided light 31a and the second divided light 31b divided by the dividing beam splitter 31; a first divided light polarizing beam splitter 32 that divides the first divided light 31a through the second quarter-wave plate 12 into first polarized light 32a and second polarized light 32b; a third quarter-wave plate 13 arranged in an optical path of the second divided 31b light through the second quarter-wave plate 12; and a second divided light polarizing beam splitter 33 that divides the second divided light 31b through the third quarter-wave plate 13 into third polarized light 33a and fourth polarized light 33b, and the light receiving unit 4A includes a plurality of light receiving units 41 to 44, and the calculating unit 6 calculates the direction of rotation of the measurement target and the amount of change in the angle due to the rotation of the measurement target based on a plurality of lights having phases different from each other received by the plurality of the receiving units 41 to 44. Incidentally, for convenience of illustrating a light receiving unit 4A, the sixth reflection unit 10 is illustrated as two members rather than one member.

The first quarter-wave plate 11 is provided on the optical path of the second light through the second reflection unit 52 and the fifth reflection unit 55. The first quarter-wave plate 11 may be provided anywhere as long as it is on one or more of the optical paths optical paths of first light via the first reflection unit 51, the second light via the second reflection unit 52, the first light via the fourth reflection unit 54 and the second light via the fifth reflection unit 55.

The dividing beam splitter 31 is a non-polarizing beam splitter. Note that the dividing beam splitter 31 divides the combined light from the second diffraction part into a first divided light 31a and a second divided light 31b, as the averaged non-polarized light.

The first divided light polarizing beam splitter 32 and the second divided light polarizing beam splitter 33 are optical device that separates the divided light 31a and 31b from the dividing beam splitter 31 into two polarization components, S-polarized light that is S-randomly polarized light and P-polarized light that is P-randomly polarized light.

Specifically, the first divided light polarizing beam splitter 32 transmits the first polarized light 32a that is the P-polarized light and reflects the second polarized 32b light that is the S-polarized light. The second divided light polarizing beam splitter 33 transmits the third polarized light 33a that is the P-polarized light and reflects the fourth polarized light 33b that is the S-polarized light. In the present embodiment, the S-polarized light is described as the second polarized light 32b and the fourth polarized light 33b, and the P-polarized light is described as the first polarized light 32a and the third polarized light 33a. However, which polarized light is the S-polarized light or the P-polarized light is arbitrary.

The light receiving unit 4A includes a first light receiving unit 41 that receives light having a phase of zero degrees from the first polarized light 32a, a second light receiving unit 42 that receives light having a phase of 180 degrees from the second polarized light 32b, a third light receiving unit 43 that receives light having a phase of 90 degrees from the third polarized light 33a, and a fourth light receiving unit 44 that receives light having a phase of 270 degrees from the fourth polarized light 33b.

The calculating unit 6 calculates the direction of rotation of the measurement target and the amount of change in the angle due to the rotation of the measurement target based on the plurality of lights having phases different from each other received by the first light receiving unit 41, second light receiving unit 42, third light receiving unit 43, and fourth receiving unit 44.

Hereinafter, the optical path of the light after the dividing beam splitter 31 will be described.

The first divided light 31a becomes light whose phase is shifted by 90 degrees from the first divided light 31a by passing through the second quarter-wave plate 12, and is irradiated to the first divided light polarizing beam splitter 32. The first divided light 31a irradiated to the first divided light polarizing beam splitter 32 is divided into the first polarized light 32a that is S-polarized light and the second polarized light 32b that is P-polarized light. Then, the first light receiving unit 41 receives the first polarized light 32a and receives the interference light having a phase of 0 degree. The second light receiving unit 42 receives the second polarized light 32b and receives the interference light having a phase of 180 degree.

The second divided light 31b becomes light whose phase is shifted by 180 degrees from the second divided light 31b by passing through the second quarter-wave plate 12 and the third quarter-wave plate 13, and is irradiated to the second divided light polarizing beam splitter 33. The second divided light 31b irradiated to the second divided light polarizing beam splitter 33 is divided into the third polarized light 33a that is S-polarized light and the fourth polarized light 33b that is P-polarized light. Then, the third light receiving unit 43 receives the third polarized light 33a and receives the interference light having a phase of 90 degree. The fourth light receiving unit 44 receives the fourth polarized light 33b and receives the interference light having a phase of 270 degree. Accordingly, the calculation unit 6 (see FIG. 3) can acquire a four-phase signal from the plurality of light receiving units 41 to 44. The calculating unit 6 calculates and detects the direction of rotation of the measurement target and the amount of change in the angle due to the rotation of the measurement target by the calculation based on this four-phase signal.

In such a second embodiment, it is also possible to acquire functions and effects similar to those in (1) to (7) in the first embodiment. In addition, the following function and effect can be acquired.

(8) Since the optical angle sensor 1A includes a first quarter-wave plate 11 provided on the optical path of the second light, and the light receiving unit 4A includes the first light receiving unit that receives light having a phase of zero degrees, second light receiving unit 42 that receives light having a phase of 180 degrees, the third light receiving unit 43 that receives light having a phase of 90 degrees, and the fourth light receiving unit 44 that receives light having a phase of 270 degrees, the optical angle sensor 1A can detect four-phase signal from the combined light. Therefore, the optical angle sensor 1A can acquire the four-phase signal from the plurality of diffracted lights, and detect the displacement of the angle due to the rotation of the measurement target with high accuracy.

Third Embodiment

In the following, the third embodiment of the present invention will be described on the basis of FIG. 6. In the following description, portions already described are denoted by the same reference numerals, and description thereof is omitted.

Figure 6:
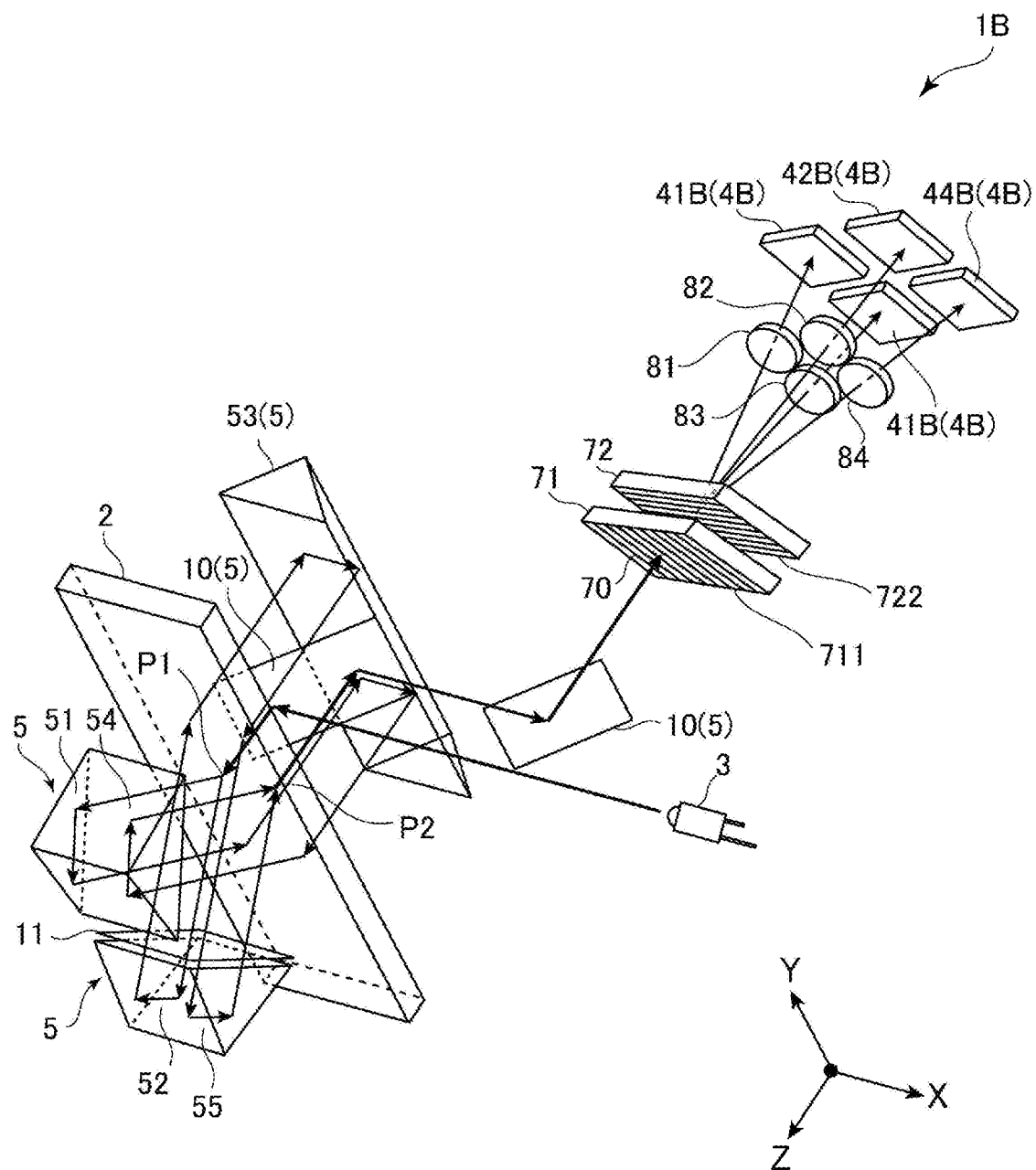
FIG. 6 is a schematic view illustrating an optical angle sensor according to the third embodiment.

FIG. 6 is a schematic view illustrating an optical angle sensor 1B according to the third embodiment.

In the second embodiment, the optical angle sensor 1A includes the dividing beam splitter 31, the second quarter-wave plate 12, the third quarter-wave plate 13, the first divided light polarizing beam splitter 32, the second divided light polarizing beam splitter 33, and the plurality of light receiving unit 41 to 44.

As shown in FIG. 6, the third embodiment is different from the second embodiment in that the optical angle sensor includes: a quarter-wave plate 11 arranged on one or more optical paths of first light via the first reflection unit 51, the second light via the second reflection unit 52, the first light via the fourth reflection unit 54 and the second light via the fifth reflection unit 55; a second diffraction unit 71 having an illumination surface 70 to which the combined light is irradiated and a diffraction grating 711 that is provided along a predetermined direction and that combines the combined light into a plurality of diffracted lights; a third diffraction unit 72 having a diffraction grating 722 provided along a direction orthogonal to a predetermined direction along which the diffraction grating 711 of the second diffraction unit 71 is provided, and further making the plurality of diffracted lights by the second diffracting unit 71 into a plurality of diffracted lights; and a plurality of polarizers 81 to 84 arranged on the optical paths of plurality of diffracted lights by the third diffraction unit 72 and converting the plurality of diffracted lights into a plurality of polarized lights having phases different from each other, and the light receiving unit 4B includes a plurality of light receiving units 41B to 44B corresponding to each of the plurality of polarizers 81 to 84, and the calculating unit 6 calculates the rotation direction of the measurement target and the amount of change in the angle due to the rotation of the measurement target based on the plurality of lights having phases different from each other received by the plurality of light receiving units 41B to 44B. Incidentally, for convenience of illustrating a light receiving unit 4A, the sixth reflection unit 10 is illustrated as two members rather than one member.

The second diffraction unit 71 and the third diffraction unit 72 divide the combined light from the second diffraction part 22 into four diffracted lights as the averaged non-polarized light.

The plurality of polarizers 81 to 84 are polarized lenses. The plurality of polarizers included a first polarizer 81, a second polarizer 82, a third polarizer 83, and a fourth polarizer 84. Incidentally, any material may be used as the plurality of polarizers 81 to 84 as long as it can polarize incident light.

The light receiving unit 4B is provided on a single surface facing the plurality of polarizers 81 to 84. The light receiving unit 4B includes a first light receiving unit 41B, a second light receiving unit 42B, a third light receiving unit 43B and a fourth light receiving unit 44B.

A plurality of diffracted lights divided by the second diffraction unit 71 and the third diffraction unit 72 become a plurality of polarized lights having phases different from each other when the plurality of diffracted lights passes the plurality of polarizers 81 to 84.

The first light receiving unit 41B receives light that is transmitted through the first polarizer 81 and that has a phase of 0 degrees. The second light receiving unit 42B receives light that is transmitted through the second polarizer 82 and that has a phase of 90 degrees. The third light receiving unit 43B receives light that is transmitted through the third polarizer 83 and that has a phase of 180 degrees. The fourth light receiving unit 44B receives light that is transmitted through the fourth polarizer 84 and that has a phase of 270 degrees.

Accordingly, the calculating unit 6 can acquire the four-phase signal from the light receiving unit 4B, and can calculate and detect the direction of rotation of the measurement target and the amount of change in the angle due to the rotation of the measurement target from the four-phase signal.

Since the light receiving unit 4B is provided on a single surface facing the plurality of polarizers 81 to 84, the light receiving unit 4B can be modularized. Therefore, the optical angle sensor 1B does not need to be provided with the plurality of light receiving units 41B to 44B at each position where light is irradiated as in the second embodiment, which can reduce cost and save space.

In such a third embodiment, it is also possible to acquire functions and effects similar to those in (1) to (7) in the first embodiment. In addition, the following function and effect can be acquired.

(9) Since the optical angle sensor 1B includes the quarter-wave plate 11 provided on the optical path of the second light, the plurality of polarizers 81 to 84 corresponding to the plurality of diffracted lights diffracted by the second diffraction unit 71 and the third diffraction unit 73, and plurality of light receiving units 41B to 44B corresponding to the plurality of polarizers 81 to 84, compared to optical angle sensor in the second embodiment including the dividing beam splitter 31, the first divided light polarizing beam splitter 32, and the second divided light polarizing beam splitter 33, the optical angle sensor 1B can acquire a four-phase signal without using these optical components. Thus, compared to the optical angle sensor 1A in the second embodiment, it is possible to achieve space saving and cost reduction while achieving high accuracy.

(10) The light receiving unit 4B includes the plurality of light receiving units 41B to 44B that is provided on the same plane in a manner of facing the plurality of polarizers 81 to 84 and that respectively correspond to the plurality of polarizers 81 to 84. Thus, the optical angle sensor 1B can be downsized by modularization.

Modification of Embodiment

Note that the present invention is not limited to each of the above embodiments and modification, improvement, and the like within the spirit and the scope of the present invention are included.

For example, in the above embodiments, the optical angle sensor (1, 1A to 1B) is provided in a measuring instrument but may be provided in a something else instead of the measuring instrument. That is, what is provided with the optical angle sensor is not particularly limited.

In the embodiments described above, the optical sensor (1, 1A to 1B) detects the amount of change in the angle from the ±1st-order diffracted light, but it is a matter of design based on which light the optical angle sensor detects the variation amount in the angle. In short, the calculating unit only needs to be able to calculate the amount of change in the angle based on the change in the interference signal due to the combined light as the diffraction unit rotates.

In each of embodiments described above, the third reflection unit 53 is a single member that reflects the first light and the second light toward the second diffraction part. However, the third reflection unit may be a plurality of members provided individually corresponding to the first light and the second light. In short, the third reflection unit may be single or plural as long as it can reflect the first light and the second light that have passed through the second diffraction part toward the second diffraction part. Further, the third reflection unit may be formed in any shape.

Figure 7:
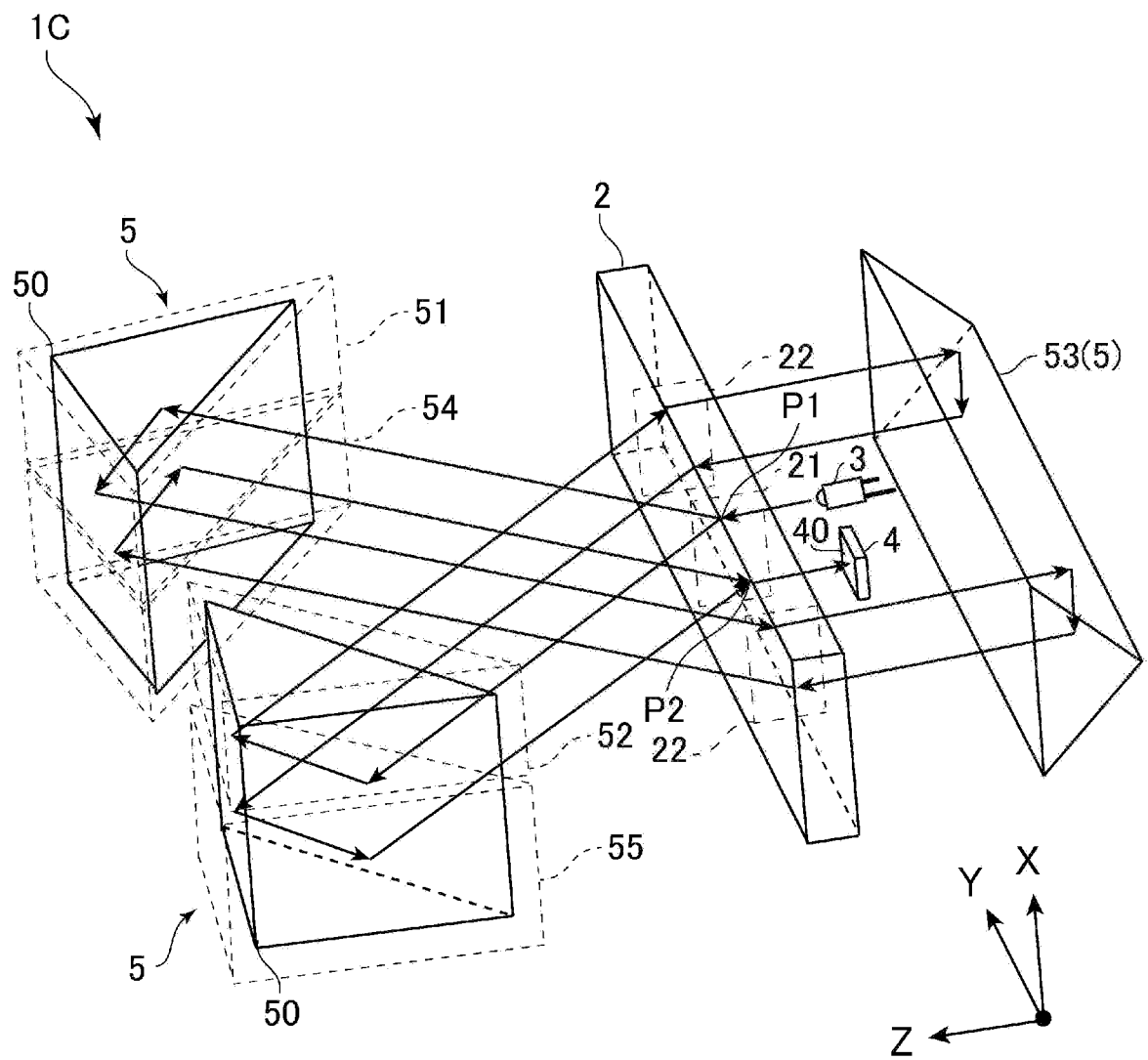
FIG. 7 is a schematic view illustrating an optical angle sensor according to a first modified embodiment.

FIG. 7 is a schematic view illustrating an optical angle sensor 1C according to a first modified embodiment.

In each of the embodiments described above, the optical angle sensor (1, 1A to 1B) is provided with the sixth reflection unit 10.

The optical angle sensor 1C in the present modified embodiment is different from each of the embodiments described above in that the optical angle sensor 1C is not provided with the sixth reflection unit. As shown in FIG. 7, the light receiving unit 4 can receive the combined light through the diffraction unit 2 that rotates in synchronization with the rotation of the measurement target, even the sixth reflection unit is not provided.

Figure 8A:
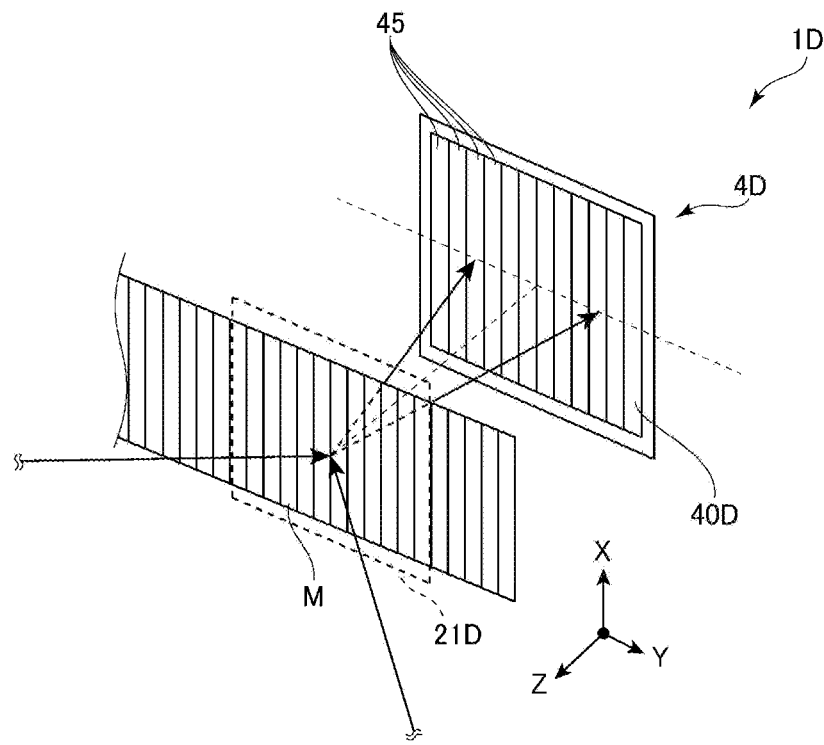
FIGS. 8A and 8B are schematic diagrams showing the first diffraction part and the light receiving unit in the optical angular sensor according to the second modified embodiment and the third modified embodiment.
Figure 8B:
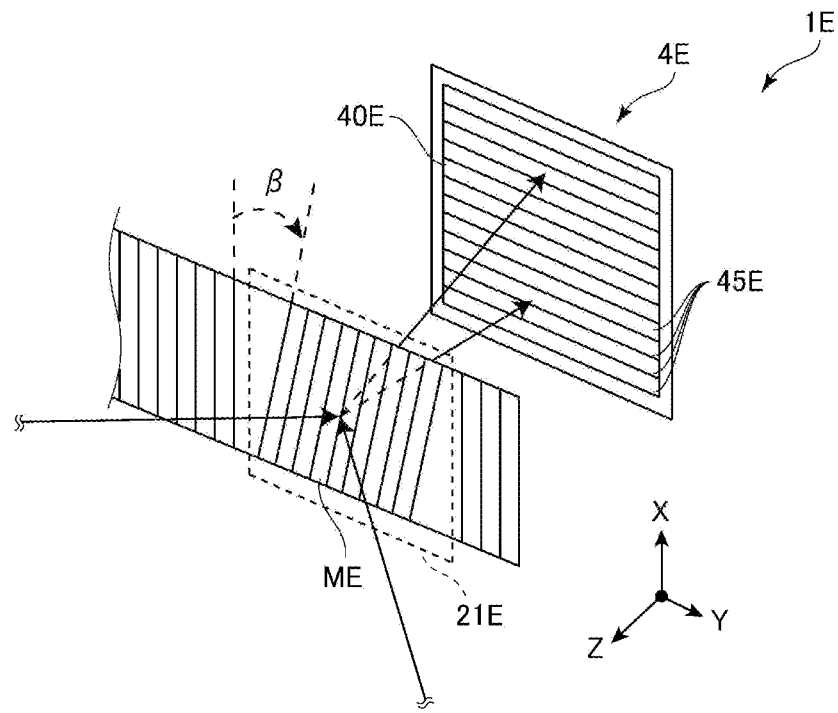
Figure 9A:
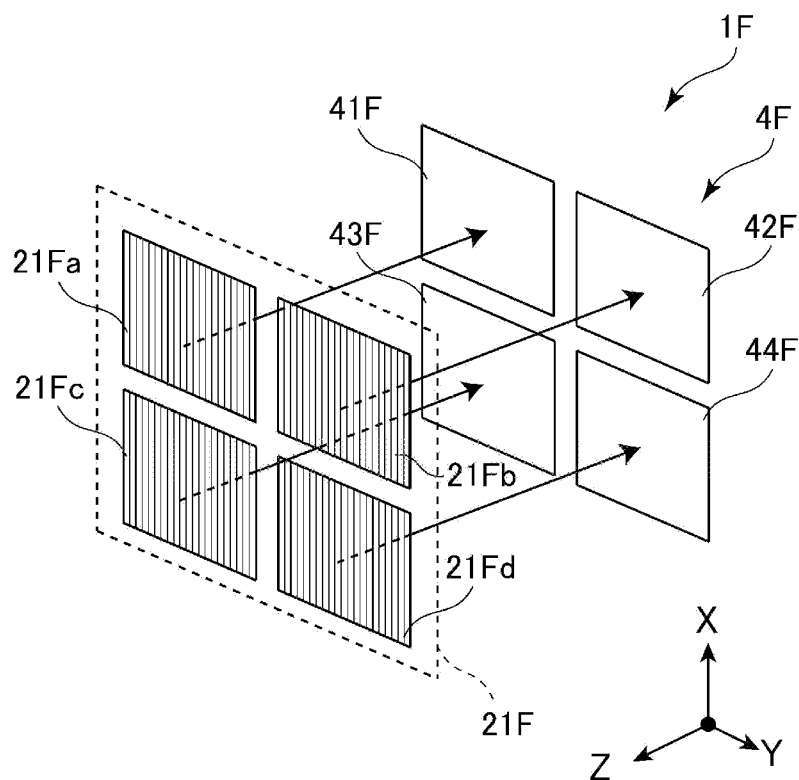
FIGS. 9A and 9B are schematic diagrams showing the first diffraction part and the light receiving unit in the optical angular sensor according to the fourth modified embodiment.
Figure 9B:
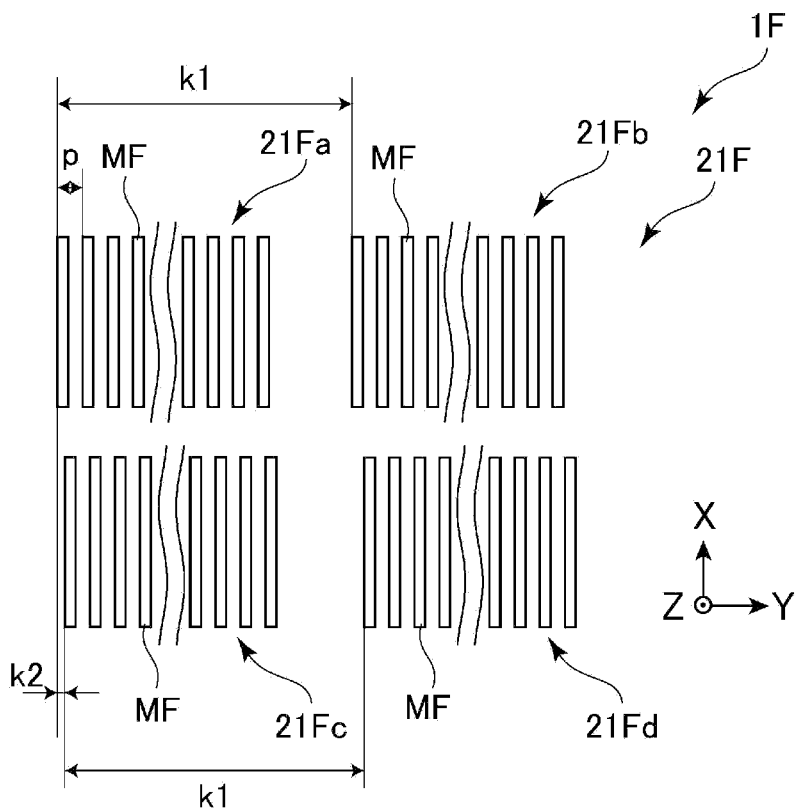
Figure 10A:
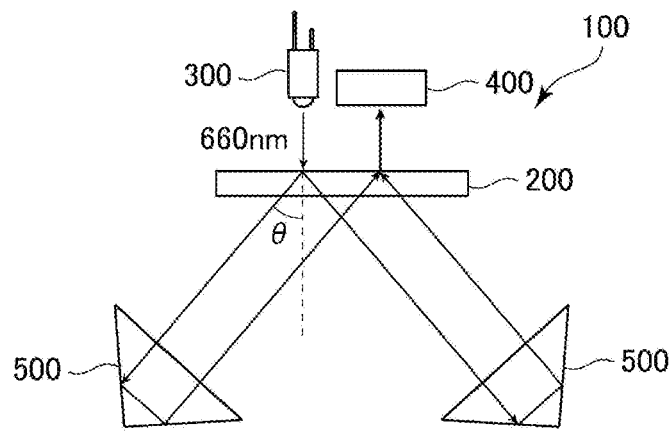
FIGS. 10A to 10C illustrate a conventional optical angle sensor.
Figure 10B:
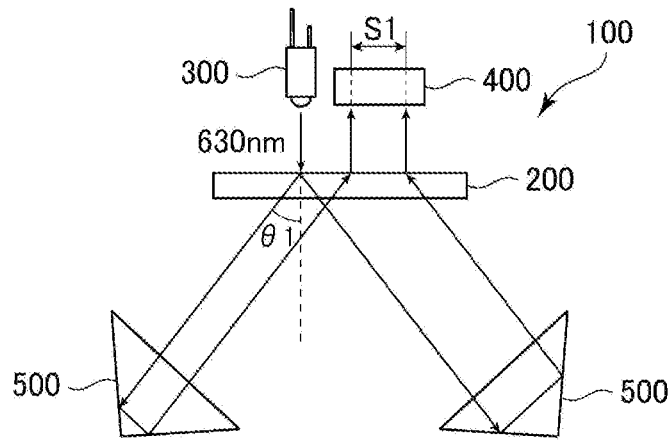
Figure 10C:
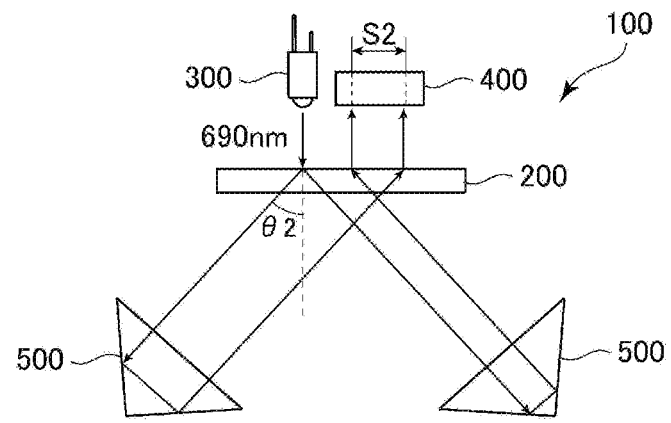

FIGS. 8A and 8B are schematic diagrams showing the first diffraction part 21D and 21E and the light receiving unit 4D and 4EW in the optical angular sensor 1D and 1E according to the second modified embodiment and the third modified embodiment. Specifically, FIG. 8A illustrates the second modified embodiment, and FIG. 8B illustrates the third modified embodiment. Further, FIGS. 9A and 9B are schematic diagrams showing the first diffraction part 21F and the light receiving unit 4F in the optical angular sensor 1F according to the fourth modified embodiment.

The first diffraction part and the light receiving unit for generating the combined light in the diffraction unit of the optical angle sensor according to the present invention are not limited to those shown in the second embodiment and the third embodiment, and may be the first diffraction part and the light receiving unit as shown in the second to fourth modified embodiments.

Further, in the present invention, since the optical path between the light from the light source and the combined light can be offset by the third reflection unit, the first diffraction part may be provided with a region for dividing the light from the light source and a region for generating the combined light separated from each other.

Incidentally, in FIGS. 8A to 9B, for convenience of explanation, the region of the first diffraction part for dividing the light from the light source is not illustrated, and only the region of the first diffraction part for generating a combined light according to a modified embodiment is illustrated.

For example, as shown in FIG. 8A, the light receiving unit 4D according to the second modified embodiment comprises a plurality of light receiving elements 45 which are arranged along the Y direction that is the same direction as the direction in which the diffraction grating M is provided. In the second modified embodiment, the first light through the diffraction grating is diffracted in −Y direction side, the second light is diffracted in the +Y direction side. Here, when the first light is for example+first-order diffracted light and the second light is for example−first-order diffracted light, the other order of diffracted light (e.g. ±second-order) is diffracted in a direction different from the first light and the second light. Therefore, other order of diffracted light is not irradiated to the light receiving unit 4D. The first light (+first order diffracted light) and the second light (−first order diffracted light) generate interference fringes on the light receiving surface 40D of the light receiving unit 4D along the X direction that is a direction parallel to the rotation axis of the diffraction unit 2.

The plurality of light receiving elements 45 are arranged in synchronization with the period of the interference fringes in order to acquire a four-phase signal (a plurality of sinusoidal signals) having a phase difference. At this time, when the diffraction grating M of the first diffraction part 21 (see FIG. 1) that divides the light from the light source 3 is designed to have a period of 1 μm, for example, the diffraction grating M of the first diffraction part 21D for generating combined light is designed to have a period of 1.005 μm, with a slight deviation from the period of the diffraction grating M of the first diffraction part 21. Then, the plurality of light receiving elements 45 are designed to have a period of 1.005 μm in such a manner as to have the same period as the diffraction grating M of the first diffraction part 21D.

The plurality of light receiving elements 45 include an element that receives light having a phase of zero degrees, an element that receives light having a phase of 90 degrees, an element that receives light having a phase of 180 degrees, and an element that receives light having a phase of 270 degrees. These elements are repeatedly arranged in order along the Y direction. The calculating unit 6 can calculate the direction of rotation of the measurement target and the amount of change in the angle due to the rotation of the measurement target from the four-phase signal based on the interference fringes received by the light receiving unit 4D.

Further, as shown in FIG. 8B, the light receiving unit 4E according to the third modified embodiment comprises a plurality of light receiving elements 45E which are arranged along the direction parallel to the X direction that is the rotation axis AX of the diffraction unit 2. At this time, the first diffraction part 21E includes an inclined diffraction grating ME disposed with a predetermined inclination angle β. The first light transmitted through the inclined diffraction grating is diffracted in +X direction side, the second light is diffracted in −X direction side.

Here, when the first light is for example+first-order diffracted light and the second light is for example−first-order diffracted light, the other order of diffracted light (e.g. ±second-order) is diffracted in a direction different from the first light and the second light. Therefore, other order of diffracted light is not irradiated to the light receiving unit 4E. The first light (+first order diffracted light) and the second light (−first order diffracted light) generate interference fringes on the light receiving surface 40E of the light receiving unit 4E along the Y direction that is a direction perpendicular to the rotation axis AX of the diffraction unit 2.

The plurality of light receiving elements 45E are arranged in synchronization with the period of the interference fringes generated on the light receiving surface 40E so as to be able to acquire a four-phase signal. At this time, the plurality of light receiving elements 45E, as in the second modified embodiment, include an element that receives light having a phase of zero degrees, an element that receives light having a phase of 90 degrees, an element that receives light having a phase of 180 degrees, and an element that receives light having a phase of 270 degrees. These elements are repeatedly arranged in order along the X direction. The calculating unit 6 can calculate the direction of rotation of the measurement target and the amount of change in the angle due to the rotation of the measurement target from the four-phase signal based on the interference fringes received by the light receiving unit 4E.

In the fourth modified embodiment, as illustrated in FIG. 9A, the first diffraction part 21F includes a plurality of diffraction parts 21Fa to 21Fd having different phases from each other. The light receiving unit 4F includes a plurality of light receiving units 41F to 44F respectively corresponding to the plurality of diffraction parts 21Fa to 21Fd.

As illustrated in FIG. 9B, in a case where a period of the diffraction grating MF is p, an integer is n, and an offset is k, the plurality of diffraction parts 21Fa to 21Fd, which are provided side by side in the Y direction, are arranged in a relationship as represented by the expression (1).

$$k1 = n \times p + p/8 \tag{1}$$

Specifically, the diffraction part 21Fb is arranged offset from the diffraction part 21Fa by the value of k1 acquired from the expression (1). The diffraction part 21Fc is arranged offset in the Y axis direction from the diffraction part 21Fa by the value of k2 acquired from p/4. The diffraction part 21Fd is arranged offset from the diffraction part 21Fc, by the value of k1 acquired from the expression (1).

The plurality of light receiving units 41F to 44F respectively receive interfering lights having different phases from the plurality of diffraction parts 21Fa to 21Fd.

The calculating unit 6 can calculate the direction of rotation of the measurement target and the amount of change in the angle due to the rotation of the measurement target based on the light received by the plurality of light receiving units 41F to 44F.

Therefore, the optical angle sensor may detect the amount of change in the angle of the measurement target by using any first diffraction part and light receiving unit, those described in the second embodiment, third embodiment, and the second to fourth modified embodiments. In short, the diffraction unit in the optical angle sensor is attached to a measurement target that rotates around a predetermined axis as a rotation axis, and rotates in synchronization with the rotation of the measurement target, and the calculating unit only need to be able to calculate the amount of change in the angle from the interference signal due to the rotation of the diffraction unit based on the combined light received by the light receiving unit.

INDUSTRIAL APPLICABILITY

As described above, the present invention can be suitably applied to an optical angle sensor.

What is claimed is:

1. An optical angle comprising:
a diffraction unit having a diffraction grating disposed at a predetermined period along the measurement direction;
a light source for irradiating light toward the diffraction unit;
a light receiving unit for receiving light through the diffraction unit;
a calculating unit for calculating the amount of change in the angle of measurement target which rotates around a predetermined axis as a rotation axis based on the light received by the light receiving unit; and
a plurality of reflection units that are irradiated by the light source and reflect light through the diffraction unit toward the diffraction unit,
wherein the diffraction unit is attached to the measurement target, and rotates in synchronization with the rotation of the measurement target, and
the diffraction unit comprises:
a first diffraction part that divides and diffracts the light from the light source into first light and second light different from the first light, and diffracts and combines the first light and the second light through the plurality of reflection units into a combined light to be received by the light receiving unit; and
a second diffraction part that diffracts and emits the first light and the second light through the plurality of reflection units to the plurality of reflection units, and diffracts and emits the first light and the second light reflected by the plurality of reflection units that are incident in the opposite direction to the case of emission to the plurality of reflection units,
the plurality of reflection units comprises:
a first reflection unit for reflecting the first light divided and diffracted by the first diffraction part toward the second diffraction part in a direction parallel to and opposite to the direction in which the first light is incident;
a second reflection unit for reflecting the second light divided and diffracted by the first diffraction part toward the second diffraction part in a direction parallel to and opposite to the direction in which the second light is incident;
a third reflection unit for reflecting the first light and the second light through the second part unit toward the second diffraction part;
a fourth reflection unit for reflecting the first light diffracted by the second diffraction part toward the first diffraction part in a direction parallel to and opposite to the direction in which the first light is incident; and
a fifth reflection unit for reflecting the second light diffracted by the second diffraction part toward the first diffraction part in a direction parallel to and opposite to the direction in which the second light is incident,
the receiving unit includes a light receiving surface to which the combined light is irradiated, and
the calculating unit, with the rotation of the diffraction unit, calculates the amount of change in the angle based on the change in the interference signal caused by the combined light generated on the light receiving surface.

2. The optical angle sensor according to claim 1, wherein the first reflection unit and the fourth reflection unit are the same member, and the second reflection unit and the fifth reflection unit are the same member.

3. The optical angle sensor according to claim 1, wherein the third reflection unit is a single member that reflects the first light and the second light toward the second diffraction part.

4. The optical angle sensor according to claim 1, wherein the plurality of reflection units comprises a sixth reflection unit that reflects the light from the light source toward the first diffraction part and reflects the combined light toward the light receiving unit.

5. The optical angle sensor according to claim 1, wherein the third reflection unit is a prism.

6. The optical angle sensor according to claim 1, wherein the first reflection unit and the second reflection unit are arranged at positions where the difference between the optical path length of the first light from the division point of the light from the light source in the first diffraction part to the combined point for generating the combined light in the first diffraction part via the first reflection unit, the third reflection unit and the fourth reflection unit and the optical path length of the second light from the division point of the light from the light source in the first diffraction part to the combined point for generating the combined light in the first diffraction part via the second reflection unit, the third reflection unit and the fifth reflection unit is within the coherent length range of the light source.

7. The optical angle sensor according to claim 1, further comprises:
a first quarter-wave plate arranged on one or more optical paths of first light via the first reflection unit, the second light via the second reflection unit, the first light via the fourth reflection unit and the second light via the fifth reflection unit;
a dividing beam splitter that divides combined light into a first divided light and a second divided light;
a second quarter-wave plate arranged in an optical path of each of the first divided light and the second divided light divided by the dividing beam splitter;
a first divided light polarizing beam splitter that divides the first divided light through the second quarter-wave plate into first polarized light and second polarized light;
a third quarter-wave plate arranged in an optical path of the second divided light through the second quarter-wave plate; and
a second divided light polarizing beam splitter that divides the second divided light through the third quarter-wave plate into third polarized light and fourth polarized light,
wherein the light receiving unit comprises:
a first light receiving unit that receives light having a phase of zero degrees from the first polarized light;
a second light receiving unit that receives light having a phase of 180 degrees from the second polarized light;
a third light receiving unit that receives light having a phase of 90 degrees from the third polarized light; and
a fourth light receiving unit that receives light having a phase of 270 degrees from the fourth polarized light, and
the calculating unit calculates the direction of rotation of the measurement target and the amount of change in the angle due to the rotation of the measurement target based on the plurality of lights having phases different from each other received by the first light receiving unit, second light receiving unit, third light receiving unit, and fourth receiving unit.

8. The optical angle sensor according to claim 1, further comprises:
a quarter-wave plate arranged on one or more optical paths of first light via the first reflection unit, the second light via the second reflection unit, the first light via the fourth reflection unit and the second light via the fifth reflection unit;
a second diffraction unit having an illumination surface to which the combined light is irradiated, and a diffraction grating that is provided along a predetermined direction and that combines the combined light into a plurality of diffracted lights;
a third diffraction unit having a diffraction grating provided along a direction perpendicular to a predetermined direction along which the diffraction grating of the second diffraction unit is provided, and further making the plurality of diffracted lights by the second diffraction unit into a plurality of diffracted lights; and
a plurality of polarizers arranged on the optical paths of plurality of diffracted lights by the third diffraction unit and converting the plurality of diffracted lights into a plurality of polarized lights having phases different from each other,
the light receiving unit includes a plurality of light receiving units corresponding to each of the plurality of polarizers, and
the calculating unit calculates the rotation direction of the measurement target and the amount of change in the angle due to the rotation of the measurement target based on the plurality of lights having phases different from each other received by the plurality of light receiving units.

* * * * *

UNITED STATES PATENT AND TRADEMARK OFFICE
CERTIFICATE OF CORRECTION

PATENT NO. : 11,199,400 B2
APPLICATION NO. : 16/881578
DATED : December 14, 2021
INVENTOR(S) : A. Kimura It is certified that error appears in the above-identified patent and that said Letters Patent is hereby corrected as shown below:

In the Claims

At Column 22, Line 4 (Claim 1), please change "of measurement" to -- of a measurement --.

Signed and Sealed this
Twenty-sixth Day of April, 2022

Katherine Kelly Vidal
*Director of the United States Patent and Trademark Office*